June 23, 1953 L. PAULETTE 2,643,092
HOIST ATTACHMENT FOR TRACTORS
Filed Nov. 18, 1949 2 Sheets-Sheet 1

INVENTOR.
LEON PAULETTE
BY
McMorrow, Berman & Davidson
ATTORNEYS

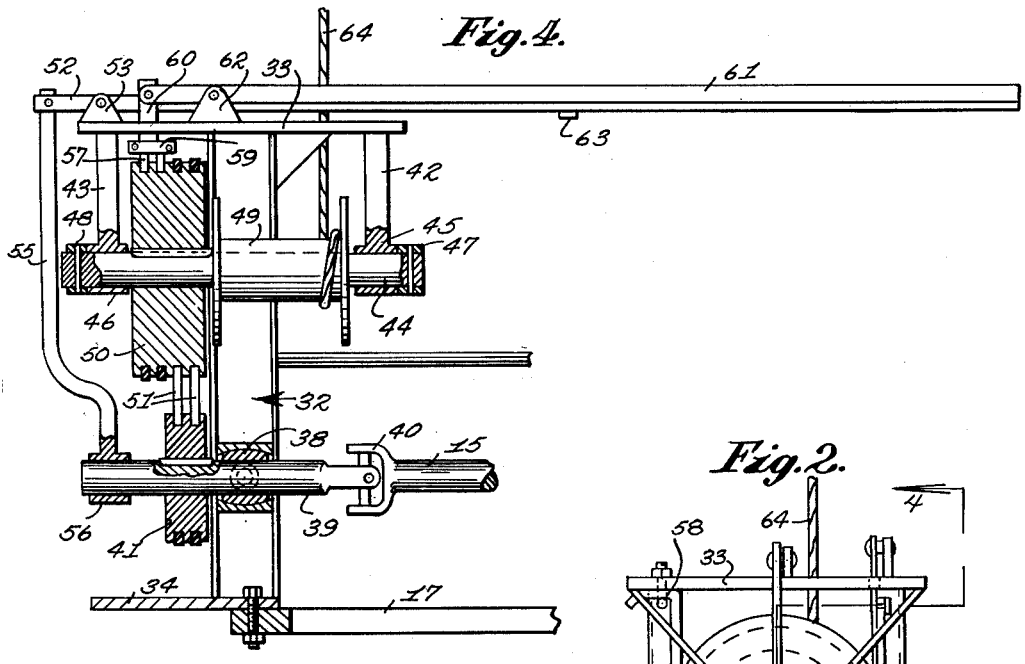
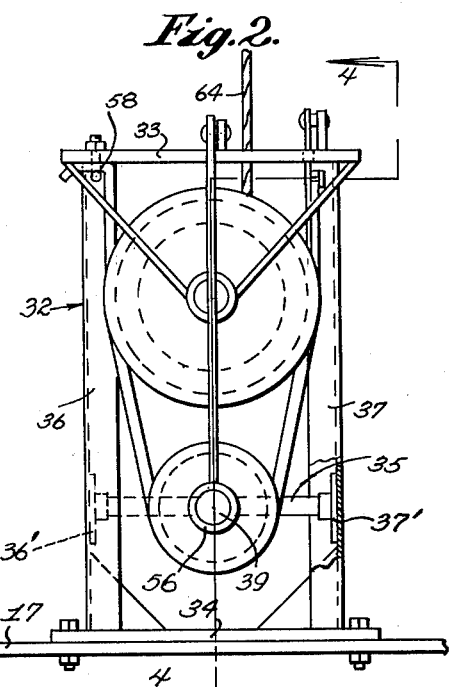
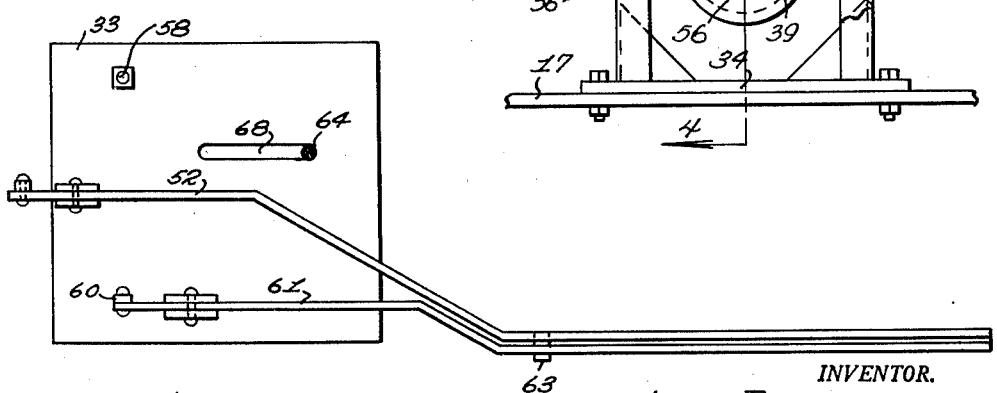
INVENTOR.
LEON PAULETTE

Patented June 23, 1953

2,643,092

UNITED STATES PATENT OFFICE 2,643,092

HOIST ATTACHMENT FOR TRACTORS

Leon Paulette, Appomattox, Va.

Application November 18, 1949, Serial No. 128,099

2 Claims. (Cl. 254—166)

This invention relates to hoist attachments for tractors, and more particularly to a hoist attachment to be mounted on an agricultural tractor for operation by the tractor power take-off connection.

It is among the objects of the invention to provide an improved hoist attachment for farm or agricultural tractors which can be easily mounted on a conventional tractor without material modification of the tractor construction and drivingly connected with the tractor power take-off connection to operate devices such as grading blades, scoops, hay lifts and hoisting tongs, which is manually controllable by the operator of the tractor for lifting and lowering operations, and which is simple and durable in construction, economical to manufacture and install, is capable of providing a translational or bulldozing operation as well as an elevational or lifting operation, and is easy to operate.

Other objects and advantages will become apparent from a consideration of the following description and the appended claims in conjunction with the accompanying drawings wherein:

Figure 2 is a rear elevation of the operating mechanism of the hoisting attachment;

Figure 3 is a top plan view of the mechanism illustrated in Figure 2; and

Figure 4 is a cross section on the line 4—4 of Figure 2.

Figure 1:
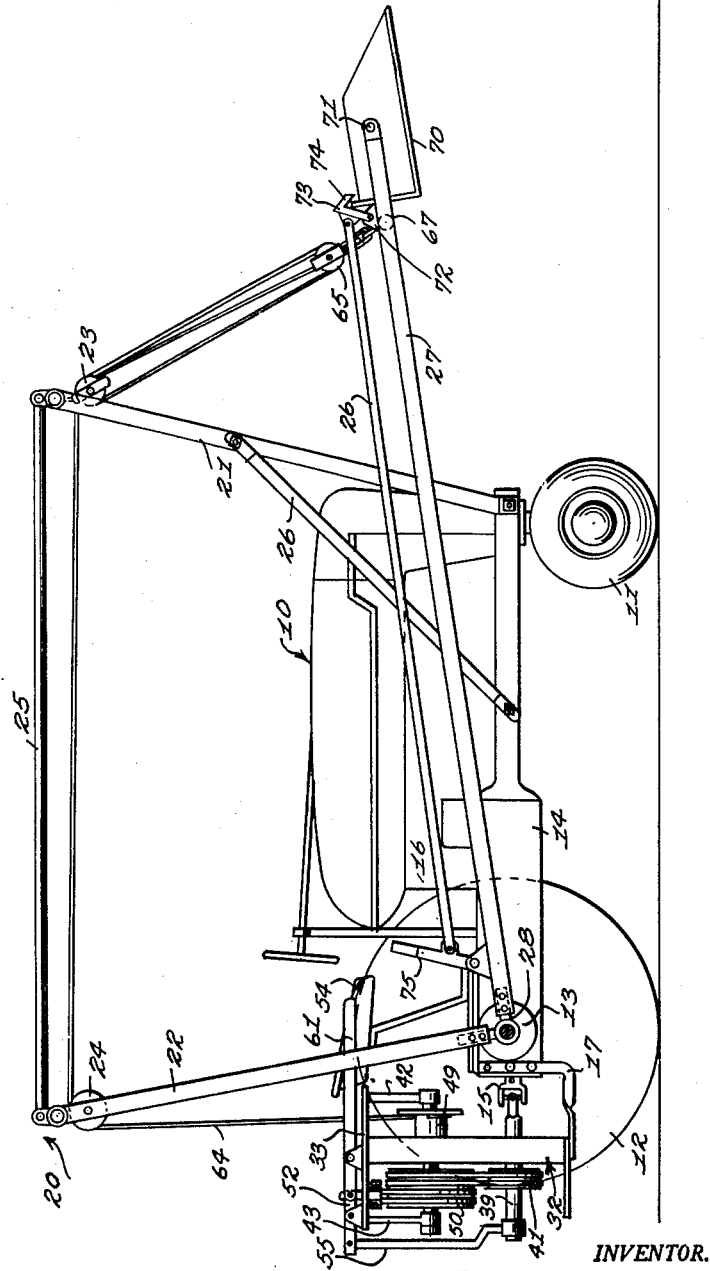
Figure 1 is a side elevation of an agricultural tractor with a hoisting attachment illustrative of the invention operatively mounted thereon, one of the tractor rear wheels being omitted and the rear axle shown in cross section to better illustrate the construction of the attachment.

With continued reference to the drawings, the tractor illustrated and generally indicated at 10 may be of conventional or well known construction and has a pair of front wheels 11, a pair of rear wheels 12, a rear axle 13 carried by the rear wheels 12 and a frame 14 supported at its rear end on the rear axle 13 and at its front end on the front wheels 11. A power take-off connection 15 projects from the rear end of the tractor frame 14 and is driven by the tractor engine 16 through the usual power transmission mechanism, and a hitch bracket 17 is secured to the tractor frame at the rear end of the latter and projects rearwardly from the frame.

The hoist attachment, generally indicated at 20, comprises a front standard 21 mounted at its lower end on the tractor frame 14 at the front end of the latter and projecting upwardly from the tractor frame with a slight forward inclination, and a rear standard 22 mounted at its lower end on the tractor rear axle 13 and projecting upwardly from the rear axle with a slight rearward inclination. Each of the standards 21 and 22 may comprise two metal tubes having their lower ends spaced apart and converging to and connected together at their upper ends. A sheave 23 having two cable pulleys journaled therein in side-by-side relationship is secured to the front standard 21 at the upper end of the latter, and a single cable pulley 24 is journaled on the rear standard 22 at the upper end of the latter. A substantially rigid tubular bar 25 is pivotally connected at its opposite ends to the front and rear standards 21 and 22 at the upper ends thereof and diagonal braces 26 are bolted at opposite ends to the tractor frame 14 and the two tubular members of the front standard to maintain the front and rear standards in upright position relative to the tractor frame, as shown in Figure 1.

A pair of elongated tubular boom arms are disposed at opposite sides of the tractor frame and extend from the rear axle 13 forwardly of the front end of the tractor frame. Each of these boom arms is pivotally connected at its rear end to the rear axle 13 by means of a bracket 28 having a circular eye surrounding the tractor rear axle and a lug received in the rear end of the corresponding boom arms 27 and secured thereto.

A rectangular attachment frame 32 is mounted at its lower end on the hitch bracket 17 and extends upwardly from the hitch bracket at a location spaced from the rear end of the tractor frame 14, and a rectangular plate 33 is secured to the top of this frame and normally occupies a substantially horizontal position. A bottom plate 34 is secured to the bottom end of the frame 32 and projects rearwardly therefrom substantially parallel to the top plate 33.

A bearing supporting bar or rod 35 has, Figure 2, at its respectively opposite ends blocks 36' and 37' which slidably engage the channel side members 36 and 37 respectively of the frame 32, the bar 35 extending across the frame substantially parallel to the bottom plate 34 and at the level of the power take-off connection 15 of the tractor. At its mid-length location the bar 35 carries a universal bearing assembly 38, and a shaft 39 is journaled in the bearing assembly 38 and extends to the front and rear sides of the frame 32. A universal joint connection 40 connects the shaft 39 at its front end to the power take-off connection 15 of the tractor, and a belt pulley 41 is secured on the shaft at the rearward side of the frame 32.

Bearing brackets 42 and 43 depend from the top plate 33 at locations spaced respectively from the front and rear sides of the frame 32, and a shaft 44 is journaled at its opposite ends in bearing sleeves 45 and 46 provided at the lower ends of the brackets 42 and 43 respectively. This shaft is maintained against longitudinal movement relative to the bearing sleeves by collars 47 and 48 secured on the shaft at the front end of the sleeve 45, and the rear end of the sleeve 46, and a cable drum or spool 49 is secured on or formed integrally with the shaft 44 intermediate the length of the latter.

A cable pulley 50 larger than the cable pulley 41 is secured on the shaft 44 at the rear end of the cable drum 49, and V-belts 51 disposed in corresponding belt grooves in the pulleys 41 and 50 drivingly interconnect these pulleys.

A manually operated control lever 52 is pivotally mounted on the top plate 33 by a lug formation 53 extending upwardly from the top plate at the rear end of the latter and this lever 52 extends forwardly to a position convenient to an operator seated on the tractor seat 54. A link 55 is pivotally connected at its upper end to the lever 52 at the rear end of the latter and rearwardly of the lug formation 53 and depends from the lever 52. At its lower end the link 55 is provided with a bearing sleeve 56 in which the shaft 39 is journaled at the rear end thereof.

With this arrangement, when the front end of the lever 52 is raised, the rear end of the shaft 39 will be forced downwardly, thereby tightening the belts 51 and providing a driving connection between the pulleys 41 and 50 to rotate the cable drum 49. When the front end of the lever 52 is lowered, the rear end of the shaft 39 and the pulley 41 will be raised, loosening the belts 51 and interrupting the drive between the pulleys 41 and 50, thereby rendering the drive means including these pulleys inoperative to rotate the cable drum 49.

The pulley 50 is provided with two belt grooves in addition to those occupied by the belts 51, and two V-belts 57 are each connected at one end to the top plate 33, as indicated at 58 in Figure 2, and are trained around the pulley 50 being respectively disposed in the additional belt grooves provided in this pulley. At their opposite ends the two belts 57 are connected by a clip 59 to a link 60 which projects upwardly through an opening in the top plate 33. A hand lever 61 is pivotally mounted on the plate 33 by an apertured lug formation 62 projecting upwardly from the plate at a location spaced forwardly of the link 60 and the link 60 is pivotally connected at its upper end to the hand lever 61 at the rear end of the latter.

With this construction, when the front end of the lever 61 is forced downwardly the belts 57 will be tightened about the pulley 50 restraining the pulley against rotation and thereby locking the cable drum 49, and when the front end of the hand lever 61 is raised, the pulley 50 and cable drum 49 will be freed for rotation in either direction. A tongue 63 is secured to the lever 52 and extends under the lever 61 so that the lever 61 cannot be depressed to stop the pulley 50 without also depressing the lever 52 to loosen the belts 51 and thereby interrupt the drive from the pulley 41 to the pulley 50.

A cable 64 is wound at one end on the drum 49 in a direction such that the cable is wound onto the drum when the drum is rotated by the tractor power take-off connection 15 through the pulleys 41 and 50 and this cable is carried over the sheave 24 on the rear support structure 22, over one of the sheaves in the block 23, over a single sheave in a block 65 secured to the booms 27 near the forward ends of the latter, over the other of the two sheaves in the block 23 and is secured at its opposite end to the block 65. The block 65 is connected to the booms 27 by suitable means, such as the links 66 extending from the block to a cross member 67 secured at its respectively opposite ends to the two booms 27 near the forward ends of the booms.

The two blocks 23 and 65 provide a power increasing assembly to multiply the pull exerted on the cable by the drum 49 as this pull is applied to the front ends of the booms 27.

An operator seated on the tractor seat 54 can operate the hand lever 61 to cause the drive means to raise the front ends of the booms 27, or to release the drive means and allow the front ends of the booms to descend, and can operate the hand lever 52 to retard the descending movement of the booms or to secure the booms at any desired position of elevation. The tractor can be driven forwardly or rearwardly at the same time the booms are raised or lowered, or with the booms held at a desired position of elevation so that the attachment can be used for a large number of different operations, such as loading and unloading farm produce, stacking hay and similar material, excavating and loading dirt, grading and terracing and lifting heavy objects.

The cable 64 extends through a slot 63 in the top plate 33 which slot is elongated longitudinally of the cable drum 49, so that the cable can wind freely onto and off of the drum as the drum rotates in the corresponding directions.

In the arrangement illustrated, a scoop 70 is disposed between the front ends of the two booms 27 and is pivotally connected intermediate its length to the booms at the front ends of the latter by pivot pins 71 extending respectively through the booms and connected to the adjacent side of the scoop. The location of the pivotal connection longitudinally of the scoop is such that when the rear end of the scoop is free, the scoop will tilt with its front end down to dump the contents thereof. A lug 72 projects upwardly from the cross member 67 and a latch dog 73 is pivotally connected at one end to this lug. At its opposite end the latch dog has a hook 74 which is engageable with the rear end of the scoop 70 to restrain the scoop from dumping. A hand lever 75 is pivotally mounted at its lower end on one of the booms 27 and adjacent the seat 54 and a rod 76 connects this hand lever to the latch dog 73, so that the operator of the machine can retract the hook 74 from the back wall of the scoop and free the scoop to dump its contents when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a cable-winding attachment for a tractor having a frame and a power take-off projecting from the frame, a support adapted to be fixed on the frame in the region of the power take-off, a first shaft mounted on said support to be in alignment with the power take-off, a universal joint on said first shaft adapted to be connected with the power take-off, a universal bearing mounting said first shaft on said support enabling said first shaft to rock relative to said support, a second shaft mounted on said support alongside of and vertically spaced from said first shaft, cooperating pulleys fixed on said shafts, a cable drum fixed on said second shaft, belt means trained around said pulleys and normally operatively connecting the pulleys whereby the cable drum is driven from the tractor power take-off, brake band means trained around the second shaft pulley and secured at one end to said support, first and second levers pivoted intermediate their ends on said support, first means operatively connecting said first lever to said first shaft for shifting said first shaft toward and away from said second shaft to loosen and tighten said belt means for varying the degree of operative connection of said belt means with said pulleys, second means operatively connecting the other end of the brake band means to said second lever, and a finger projecting from said first lever and engageable with the under surface of said second lever whereby pivoting of said second lever in the direction to tighten said brake band means on the second shaft pulley produces pivoting of said first lever in a direction to loosen said belt means.

2. In a cable winding attachment for a tractor having a frame and a power take-off projecting from the frame, a support adapted to be fixed on the frame in the region of the power take-off, a first shaft mounted on said support to be in alignment with the power take-off, a universal joint on said first shaft adapted to be connected with the power take-off, a universal bearing mounting said first shaft on said support enabling said first shaft to rock relative to said support, a second shaft mounted on said support alongside of and vertically spaced from said first shaft, cooperating pulleys fixed on said shafts, a cable drum fixed on said second shaft, belt means trained around said pulleys and normally operatively connecting the pulleys whereby the cable drum is driven from the tractor power take-off, brake band means trained around the second shaft pulley and secured at one end to said support, first and second levers pivoted intermediate their ends on said support, first means operatively connecting said first lever to said first shaft for shifting said first shaft toward and away from said second shaft to loosen and tighten said belt means for varying the degree of operative connection of said belt means with said pulleys, and second means operatively connecting the other end of the brake band means to said second lever for actuating the brake band means.

LEON PAULETTE.

References Cited in the file of this patent
UNITED STATES PATENTS

| Number | Name | Date |
|---|---|---|
| 1,491,718 | Miller | Apr. 22, 1924 |
| 2,257,796 | Heineke | Oct. 7, 1941 |
| 2,402,071 | Nehring | June 11, 1946 |
| 2,456,852 | Anderson | Dec. 21, 1948 |
| 2,469,187 | Warnock et al. | May 3, 1949 |
| 2,579,888 | Watt | Dec. 25, 1951 |